United States Patent [19]

Arnett et al.

[11] Patent Number: 5,602,806
[45] Date of Patent: Feb. 11, 1997

[54] MAGNETO-OPTICAL RECORDING DEVICE CAPABLE OF REDUCING THERMAL INTERFERENCE BETWEEN RECORDING PITS

[75] Inventors: Patrick C. Arnett, Morgan Hill; David E. Call, Hollister, both of Calif.; Blair I. Finkelstein; Glen A. Jaquette, both of Tucson, Ariz.; Ernesto E. Marinero, Saratoga, Calif.

[73] Assignee: International Business Machines Corporation, Armonk, N.Y.

[21] Appl. No.: 495,967

[22] Filed: Jun. 28, 1995

[51] Int. Cl.$^6$ .................................................. G11B 11/00
[52] U.S. Cl. ...................................... 364/13; 360/59
[58] Field of Search ................................. 369/13, 14, 116, 369/110; 360/59, 114, 46; 365/122

[56] References Cited

U.S. PATENT DOCUMENTS

| | | | |
|---|---|---|---|
| 4,679,180 | 7/1987 | Kryder et al. | 369/13 |
| 4,888,750 | 12/1989 | Kryder et al. | 369/13 |
| 4,939,717 | 7/1990 | Ohno et al. | 369/116 |
| 5,093,817 | 3/1992 | Fujii et al. | 369/13 |
| 5,121,369 | 6/1992 | Makansi | 369/13 |
| 5,283,770 | 2/1994 | Nakao et al. | 369/13 |
| 5,323,374 | 6/1994 | Arai et al. | 369/116 |
| 5,339,298 | 8/1994 | Saito | 369/13 |
| 5,367,507 | 11/1994 | Sato et al. | 369/13 |
| 5,457,666 | 10/1995 | Soda et al. | 369/13 |
| 5,469,422 | 11/1995 | Sohmuta | 369/13 |
| 5,487,059 | 1/1996 | Saito et al. | 369/13 |

OTHER PUBLICATIONS

Japanese Journal of Applied Physics, vol. 26, 1987, "Direct Overwrite by Light Power Modulation on Magneto–Optical Multi–Layered Media", by J. Saito, et al., Supplement 26–4.
Journal of Magnetism and Magnetic Materials, vol. 118, 1993, "Direct Overwrite in Magneto–Optic Recording", by K. Tsutsumi, pp. 231–247.

Primary Examiner—Tan Dinh
Attorney, Agent, or Firm—D. A. Shifrin

[57] ABSTRACT

A light intensity, direct overwrite, magneto-optical system generates signals such that, during the formation of a recording mark on an optical disk, a laser is driven a) at a pedestal power level, then b) at a quench power level for a first quench period $t_1$, the quench power level being less than the pedestal power level, then c) at a write power level for a write period $t_2$ whereby the reference bit becomes oriented in the writing direction, the write power level being greater than the pedestal power level, then d) at the quench power level for a second quench period $t_3$, and then e) at the pedestal power level until the formation of another recording mark begins. The system is provided with a controller to determine optimal lengths of the quench periods $t_1$ and $t_3$, thereby reducing thermal interference between closely spaced recording marks. From sample recording marks, recorded with different quench periods $t_1$ and $t_3$, the controller calculates a "quality" value, such as bit error rate, jitter or figure of merit, then determines from the quality value the quench periods $t_1$ and $t_3$ which will produce the highest quality recording marks.

25 Claims, 6 Drawing Sheets

MAGNETO-OPTICAL RECORDING DEVICE CAPABLE OF REDUCING THERMAL INTERFERENCE BETWEEN RECORDING PITS

TECHNICAL FIELD OF THE INVENTION

The present invention relates to magneto-optical recording and, in particular, to a method and apparatus for reducing thermal interference between closely spaced recording marks.

BACKGROUND OF THE INVENTION

Conventional magneto-optical (MO) technology employs a two-pass process to erase previously recorded data from an MO disk and write new or updated data onto the disk. A third pass is required to verify the newly recorded data. FIGS. 1a and 1b illustrate the process. During the erase pass (FIG. 1a), data bits 12 previously recorded on a disk 10 are heated by an unmodulated laser beam 14 as they rotate through a field from a bias magnet 16. A combination of the laser heat and the bias field cause all of the bits 12 to assume the same orientation (downward in FIG. 1a), thereby recording zeros and effectively erasing the data. During the next pass (FIG. 1b), the bias field is reversed and the laser beam 14 is modulated to create data bits 18. FIG. 1b includes a plot of the laser power over time as the laser is modulated in pulses between a high power and a quiescent level (very close to off) to change selected erased areas (digital zeros) into recording marks (digital ones). Details of such conventional procedures for erasing and writing data, as well as for reading data, are well known in the art and do not require further elaboration.

It will be appreciated that the two-pass requirement imposes a limit on recording throughput. Consequently, the ability of an MO storage system to perform direct overwrite, without a separate erase pass, has been a desirable goal.

One direct overwrite system which has been suggested includes two adjacent optical heads and two corresponding bias magnets. One head/magnet pair erases data; the other head/magnet pair records data onto the just erased area. The second head/magnet pair is also used for reading data. The cost of manufacturing and aligning such a system to the necessary degree of precision is, however, quite high, a distinct commercial disadvantage.

Another direct overwrite system is known as magnetic-field modulation (MFM) recording in which the laser beam power is maintained at a constant level while the direction of a magnetic field is rapidly modulated. To produce an effective field, the magnetic head should be very close to the recording layer of the MO disk (within several micrometers of the disk surface), a drawback which increases the mechanical complexity of the drive.

Still another direct overwrite system is known as laser-intensity modulation (LIM) recording which uses special, multilayer media and a high power pulse superimposed onto a lower pedestal (or erasing) power. As illustrated in FIG. 2, the disk 20 includes multilayered, exchange-coupled MO films 27 and 28 as active MO layers over a disk substrate. Recording marks 22 are initially formed in one of the layers, the writing or reference layer 28, during a high power portion of the recording waveform under the influence of a normal bias field from the bias magnet 26. The marks are subsequently copied into the overlying memory layer 27 by exchange-coupling during cooling after the recording marks 22 rotate away from the heat of the laser beam 24. The magnetic orientation of the reference layer 28 is reset in the erase direction when the recording marks subsequently pass through an initiating field from an initiating magnet 29, creating a series of digital zeros in the reference layer 28 without affecting the marks copied into the memory layer 27. Included in FIG. 2 is a plot of the laser power over time as new bits are recorded over previously recorded data. The laser power is modulated between the low power level (which leaves the digital zeros) and a high power level (which records digital ones).

The plots in FIGS. 1b and 2 represent pulse position modulation (PPM) recording in which each recording mark represents a digital one (or zero) and the timing positions between the recording marks represent digital zeros (or ones). FIG. 3 is a plot of laser power over time during pulse width modulation (PWM) recording in which digital ones (or zeros) are represented by transitions from low power to high power and from high power to low power. To reduce heat build up in the media, in the waveform illustrated, the mark itself comprises rapid high powered pulses; transitions between immediately adjacent high power pulses are ignored since the resulting recording marks from the individual pulses are intended to overlap each other, forming a single longer recording mark. Zeros (and ones) are represented by timing positions between the transitions.

With increased data densities, and particularly when PWM recording is employed, precise recording mark placement and well defined mark edges are very important. However, an inherent property of multilayered, direct overwrite magnetic materials is that they are two to seven times thicker than magnetic layers employed in conventional, non-overwritable MO media. Moreover, the reference layer lies 90–100 nm from the surface of the overlaying memory layer which absorbs the laser irradiation. Consequently, when recording with short pulses, excessive powers are required, particularly at the higher linear velocities at the outer diameter of the MO disk. Although the use of a pedestal power level improves recording, formation of the magnetic domain in the memory layer is accomplished only at effective media temperatures considerably higher than used on conventional MO media due to the thermal properties of the thick layered materials used in the direct overwrite media. Consequently, blooming and thermal crosstalk effects tend to reduce the quality of the resulting recording marks, and may, in fact, reduce the quality below operating specifications.

The quality of recording marks can be quantified by using several criteria. One such measure is "jitter", which is the standard deviation of the offset of the mark center (in PPM recording) or mark edge (in PWM recording) from the center of the readback clock pulse. The position error normally has a Gaussian distribution which may or may not be centered with respect to the clock pulse center; the standard deviation of the position distribution is the jitter.

A second measure of quality is the "figure of merit" (FOM), which reflects both the average mark position and the jitter of the relevant mark feature (edge or center). FOM is commonly defined as:

$$FOM = (T/2 - PS)/\text{Jitter},$$

where T is the clock period and PS is the average shift in position of the mark feature from the center of the clock pulse.

A third measure of quality is the "bit error rate" (BER), which is the ratio of the number of bits in error to the total number of bits read. The number of bits in error is determined by a bit-by-bit comparison of the data when read back against the original data intended to be recorded.

These measures of mark quality will generally be different with different drives, different media and different drive/media combinations. They can also vary within a drive as the ambient temperature changes, as the disk temperature changes (a disk tends to heat up during extensive write operations), as the drive, and particularly the laser, ages, among other factors. Consequently, no single setting of the write power level will result in optimal mark formation for all drives or even for a single drive in all conditions.

OBJECTS AND SUMMARY OF THE INVENTION

In view of the foregoing, it is an object of the present invention to provide a direct overwrite magneto-optical system in which recording mark edges are well defined and thermal interference between closely spaced recording marks is reduced.

It is a further object to provide a direct overwrite MO system with enhanced power margins.

It is a still further object to provide a laser driver for generating a recording waveform for such a direct overwrite MO system.

It is a still further object to provide a method for optimizing the recording waveform by improving the quality of recording marks.

These and other objects are achieved in this invention by modulating the laser among three power levels when forming a recording mark. The laser is maintained at an erase or pedestal power level until a recording mark is desired. The power is reduced to a quiescent level for a period of time and then increased to a write power level to form the mark. Preferably, the laser power is reduced to the quiescent level for a second period before being returned to the erase level. Consequently, a greater thermal transition is created, resulting in a better defined recording mark.

If PWM recording is used, the laser is maintained at the pedestal power level until a recording mark is desired. The power is reduced to the quiescent level for a period and then increased to write power level to form the mark. The next recording mark is formed by reducing the power to the quiescent level, then increasing it back to the write power level. After all of the successive marks have been recorded (that is, when the next transition is desired), the power is preferably reduced to the quiescent level a last time before being returned to the pedestal power level.

The present invention also provides for calibration of a direct overwrite MO system whereby the period during which the laser power is reduced to the quiescent level is adjustable. For example, the quiescent time period can be adjusted when the laser write power is calibrated, such as when an optical disk is mounted in the drive.

The present invention further provides logic to generate the recording waveform as well as the driver supplying current to drive the laser at a selected one of the three power levels.

The foregoing and other features and advantages of the invention will be apparent from the following more particular description of preferred embodiments of the invention, as illustrated in the accompanying drawings.

DETAILED DESCRIPTION OF THE INVENTION

Figure 1A:
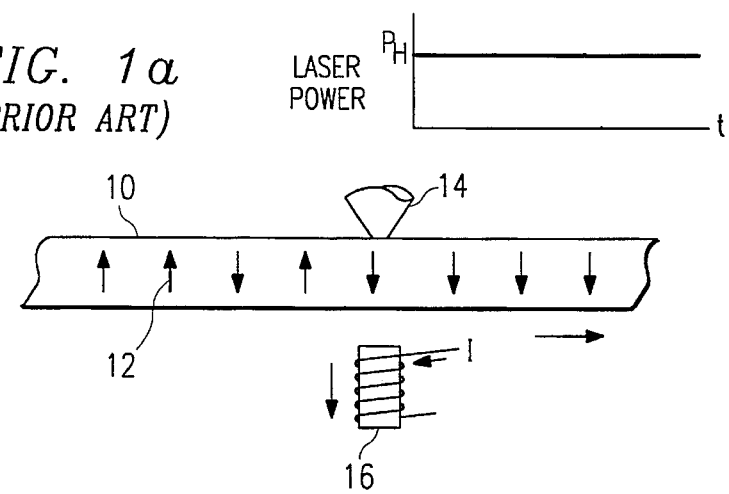
FIG. 1a illustrates a conventional MO recording system during an erase pass, including a plot of the unmodulated laser power over time.
Figure 1B:
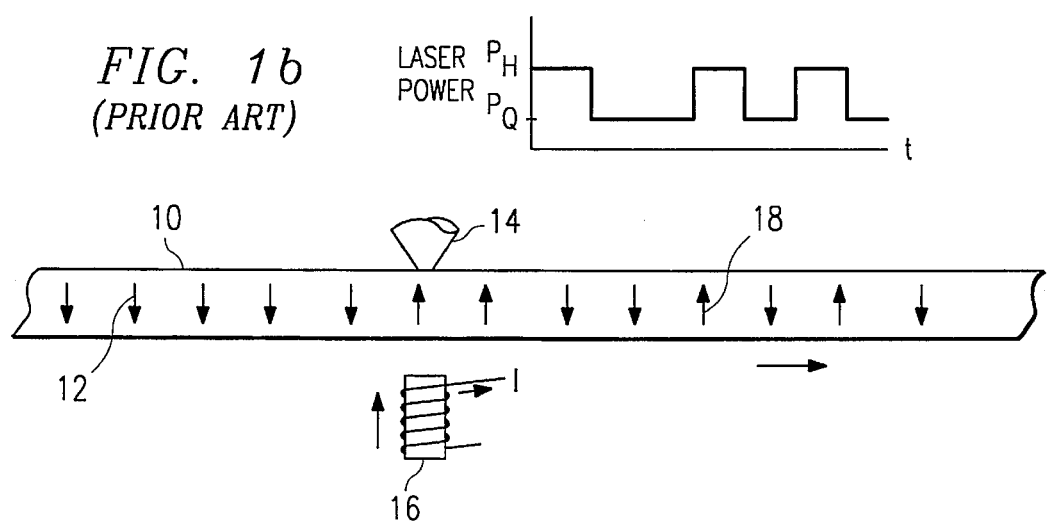
FIG. 1b illustrates the conventional MO recording system of FIG. 1a during a write pass, including a plot of the modulated laser power over time.
Figure 2:
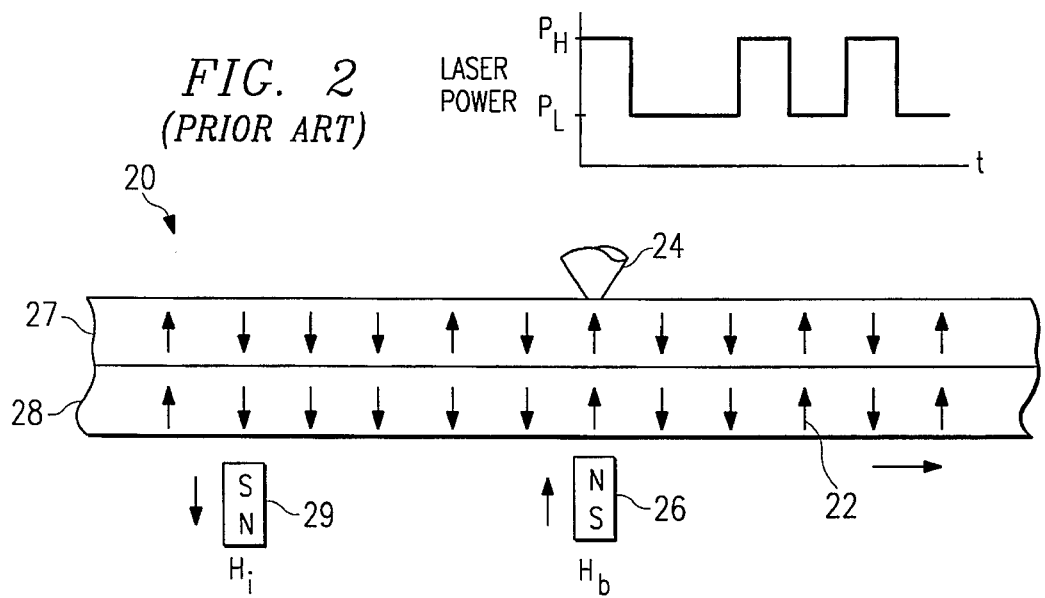
FIG. 2 illustrates a conventional direct overwrite MO recording system, including a plot of the modulated laser power over time.
Figure 3:
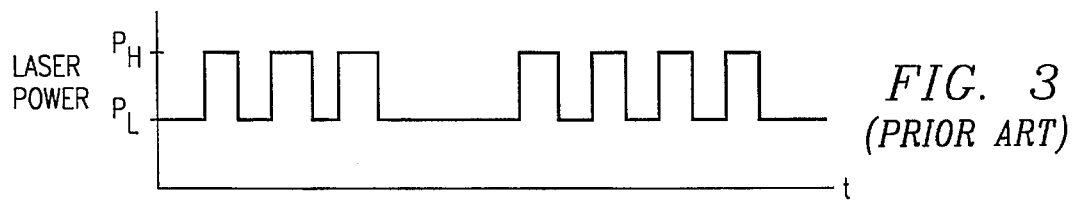
FIG. 3 is a plot of the modulated laser power over time in a conventional direct overwrite MO recording system employing PWM recording.
Figure 4:
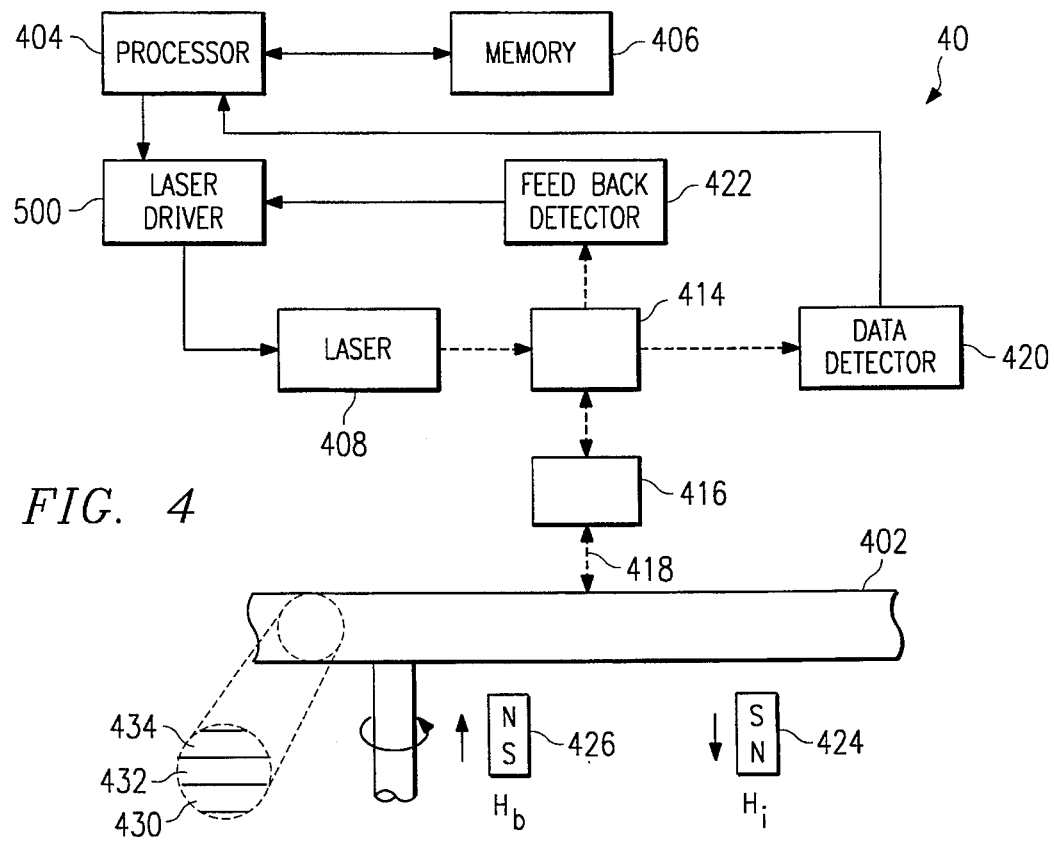
FIG. 4 is a block diagram of a direct overwrite MO storage system of the present invention.

FIG. 4 is a block diagram of a direct overwrite MO storage system 40 of the present invention, including a multilayer, exchange-coupled disk 402. The system includes a processor or system controller 404, a memory store 406 and a laser 408 controlled by the processor 404 through a laser driver 500. The laser is optically coupled to optical elements 414 and 416 which direct a light beam 418 onto the disk 402. Light reflected from the disk 402 is detected by a data detector 420, coupled to the processor 404, and a feedback detector 422, coupled to the laser driver 500. An initiating magnet 424, generating a field in a first direction (downward in the Fig.), and a bias magnet 426, generating a field in a second, opposite direction, are positioned proximate to the disk 420.

The disk 402 comprises a substrate 430 and at least a reference layer 432 and a memory layer 434. A third active magnetic layer, an initiating layer, can replace the initiating magnet 424.

Other known components of the drive 40, but which are not shown in FIG. 4, are various actuators (such as the focus, tracking/fine position, and coarse position actuators), the drive loader, and data and interface circuits.

Figure 5:
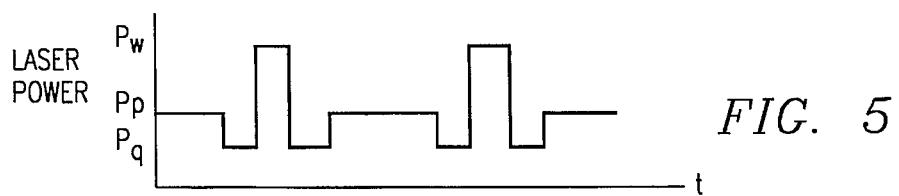
FIG. 5 is a plot of the modulated laser power over time in a direct overwrite MO recording system of the present invention employing PPM recording.

FIG. 5 is a plot of the power output of the laser in the direct overwrite drive 40 of the present invention during PPM recording. As the disk 402 rotates through the initiating magnetic field from the initiating magnet 424, all of the magnetic domains in the reference layer 432 become aligned with the initiating field, thereby erasing the data and forming zeros. The magnetic domains then rotate through the biasing magnetic field from the bias magnet 426. Simultaneously, the modulated laser beam 418 is focused onto a selected track to record data sectors.

During the operation, the laser power is modulated among three levels, resulting in three surface temperatures. The base power level is an erase or pedestal power level $P_p$: the orientation of the magnetic domains in the reference and memory layers 432 and 434 which are subjected to the pedestal power level and the bias field remain unchanged. When it is desired to reverse the domain orientation and record a digital one, the laser power is reduced to a quiescent or quench power level $P_q$, then increased to the write power level $P_w$. Preferably, the power level is also reduced to the quench power level immediately after the write pulse, then increased to the pedestal power. The heat from the laser beam 418 and the magnetic field from the bias magnet 426 cause the orientation of domains in the reference layer 432 to reverse and become aligned with the bias field. As the recorded area rotates away from the laser beam 418, the media cools and the orientation of the magnetic domains in the reference layer 432 are copied to the overlying memory layer 434.

Reducing the laser power from the pedestal power to the quench power reduces the temperature of the media. When the power is then increased to the write level, a sharper thermal gradient is created in the media, enhancing the distinctiveness of closely spaced recording marks by reducing blooming and thermal interference.

Figure 6:
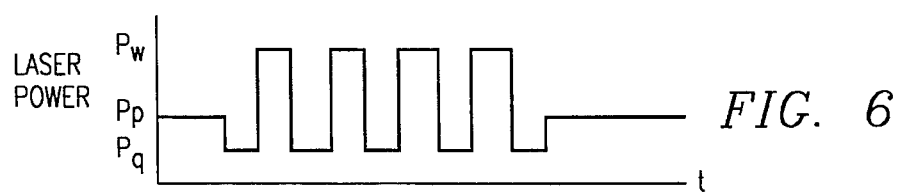
FIG. 6 is a plot of the modulated laser power over time in a direct overwrite MO recording system of the present invention employing PWM recording.

FIG. 6 is a plot of the laser output during PWM recording in which each series of adjacent write pulses form a single, elongated recording mark. Preferably, as illustrated in FIG. 6, the laser 408 is not driven at the pedestal power until the entire recording mark has been completed; that is, the laser 408 is driven at the quench power $P_q$ between immediately adjacent write power $P_w$ pulses. Sharp thermal definition of recording marks is thus achieved during such PWM recording similar to that which is achieved during PPM recording.

Figure 7:
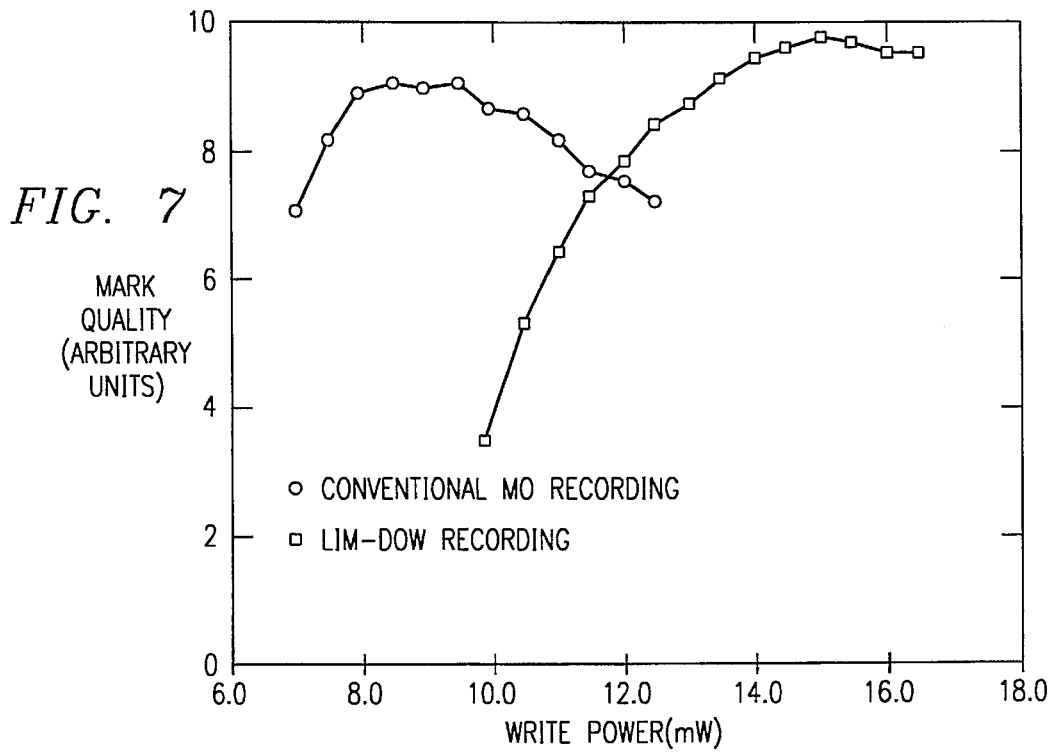
FIG. 7 is a plot of the FOM of recording marks at various write powers for conventional MO recording and for direct overwrite recording of the present invention.

FIG. 7 is a plot of the laser write power $P_w$ against an arbitrary FOM quality scale. The circular data points are the result of measurements taken using a conventional MO recording system. The highest FOM value measured for the particular drive/media combination, about 9.1, is obtained at $P_w$=8.5 mW. While it is desirable that the FOM be at least 9.0, this level is achieved over a range from about 7.8 mW to about 9.4 mW, a range of less than 2 mW which leaves only a small margin for deviations.

By contrast, the highest value achieved using the direct overwrite of the present invention (measurements indicated by the square data points), using a pedestal power $P_p$ of about 4.5 mW, is about 9.8 (obtained at about 15.0 mW).

Moreover, the FOM is at least 9.0 over a range of over 3.5 mW (from about 13.0 mW to over 16.5 mW), allowing for greater tolerance.

Figure 8A:
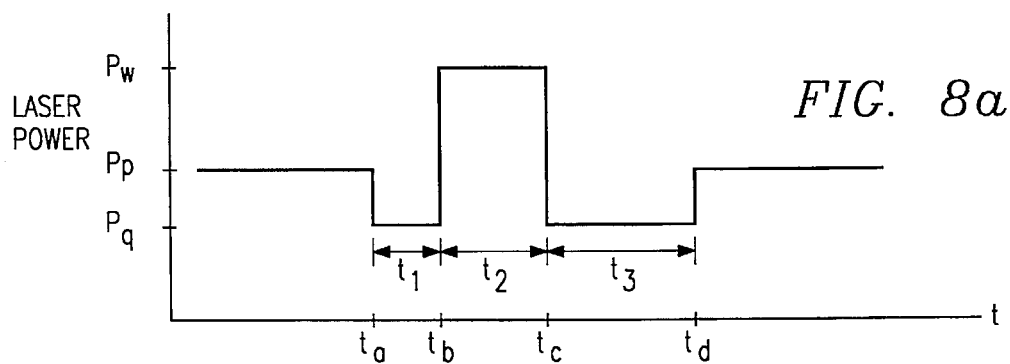
FIG. 8a is a plot of laser power over time during the recordation of a recording mark of the present invention.

FIG. 8a is a more detailed plot of the laser power (and, by implication, the corresponding laser driving current) during a single write pulse. During the period prior to writing a recording mark, the laser is driven at $P_p$. At a time $t_a$ the power is reduced to $P_q$ for a first quench period $t_1$. At the end of the first quiescent or quench period at $t_b$, the power is increased to $P_w$ during the period $t_2$ until time $t_c$. At $t_c$, the power is preferably reduced to $P_q$ for a second quench period $t_3$ until time $t_d$, after which the laser power is restored to $P_p$.

Figure 9:
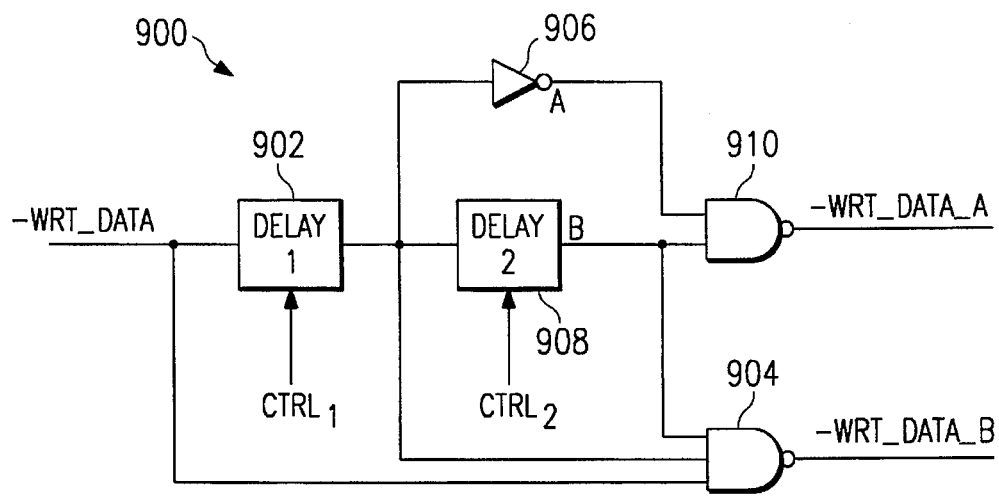
FIG. 9 illustrates a logic module of the present invention which generates the control signals of FIG. 8b.

The lengths of the periods $t_1$, $t_2$ and $t_3$ are determined by logic elements, such as the logic configuration 900 illustrated in FIG. 9. A digital -WRT__DATA signal generated by the processor 404 is received by the input of a first delay module 902 and by an input of a first logical NAND gate 904. The output of the first delay module 902 is received by a second input of the first NAND gate 904, by the input of an inverter 906 and by the input of a second delay module 908. The output of the inverter 906, a signal A, is received by an input of the second NAND gate 910. The output of the second delay module 908, a signal B, is received by a third input of the first NAND gate 904 and by a second input of the second logical NAND gate 910. The second NAND gate 910 generates a digital output signal -WRT__DATA__A; the first NAND gate 904 generates a digital output signal -WRT__DATA__B. The delay modules 902 and 908 are programmable through control inputs CTRL1 and CTRL2, respectively, coupled to the processor 404.

Figure 8B:
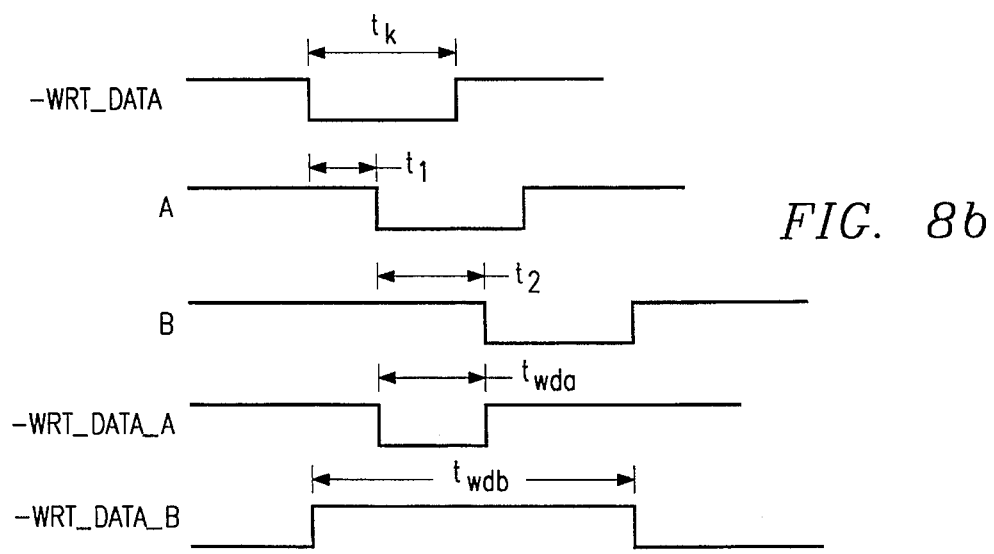
FIG. 8b illustrates timing diagrams of control signals of the present invention.

FIG. 8b illustrates the relative timing of the signals -WRT__DATA, A, B, -WRT__DATA__A and -WRT__DATA__B. The -WRT__DATA signal which is transmitted by the processor 400 to initiate the recordation of a mark, includes a pulse of width $t_k$ beginning at time $t_a$. The first delay module 902 delays the -WRT__DATA signal by a period equal to $t_1$ beginning at $t_a$ and ending at $t_b$; the second delay module 908 delays the once delayed -WRT__DATA signal by a period equal to $t_2$ beginning at $t_b$ and ending at $t_c$. The -WRT__DATA__A signal which is output by the logic module 900 includes a pulse of width $t_{wda}$ beginning at $t_b$ and ending at $t_c$. The -WRT__DATA__B signal which is output includes a pulse of width $t_{wdb}$ beginning at $t_a$ and ending at $t_d$. The width of the -WRT__DATA__A pulse is equal to, and has the same beginning and end times as, the write pulse from the laser. The width $t_{wdb}$ of the -WRT__DATA__B signal is equal to the sum of the periods $t_1+t_2+t_3$. The second quench period $t_c$ is equal to the width $t_k$ of the -WRT__DATA signal.

Figure 10:
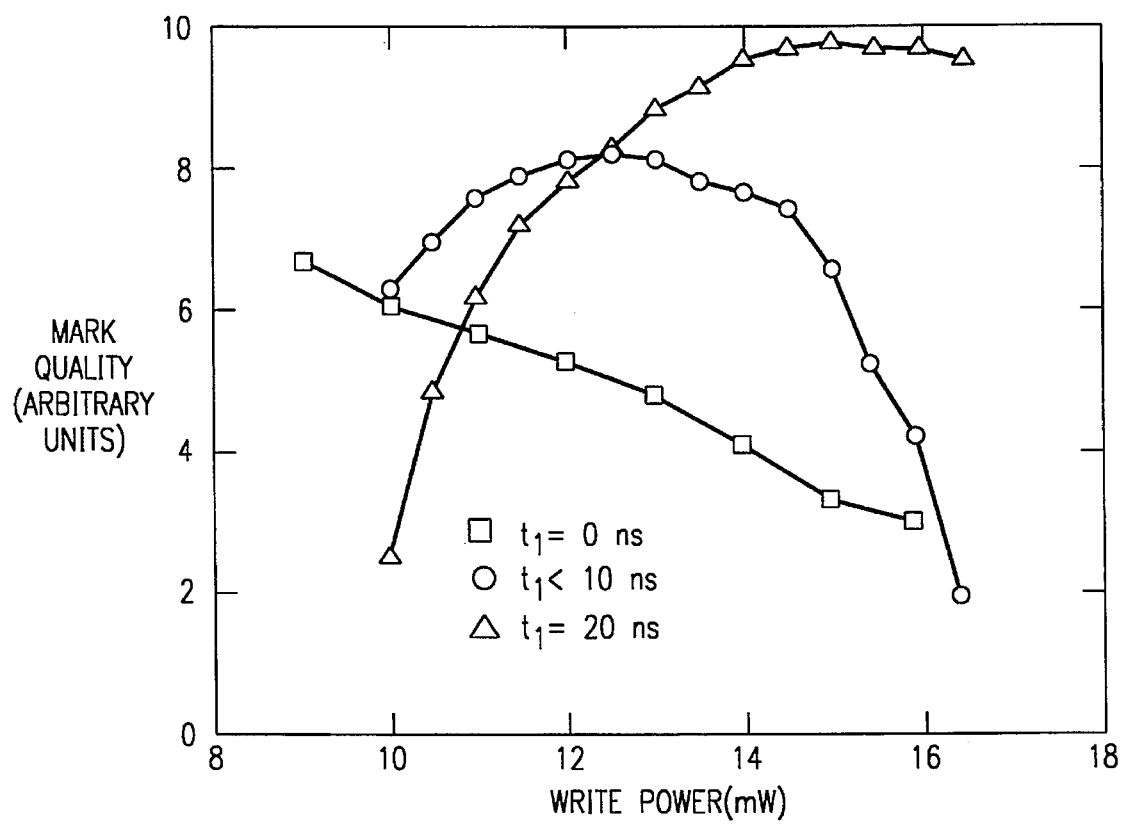
FIGS. 10 and 11 are plots of the quality of recording marks at various write powers for three quench periods.
Figure 11:
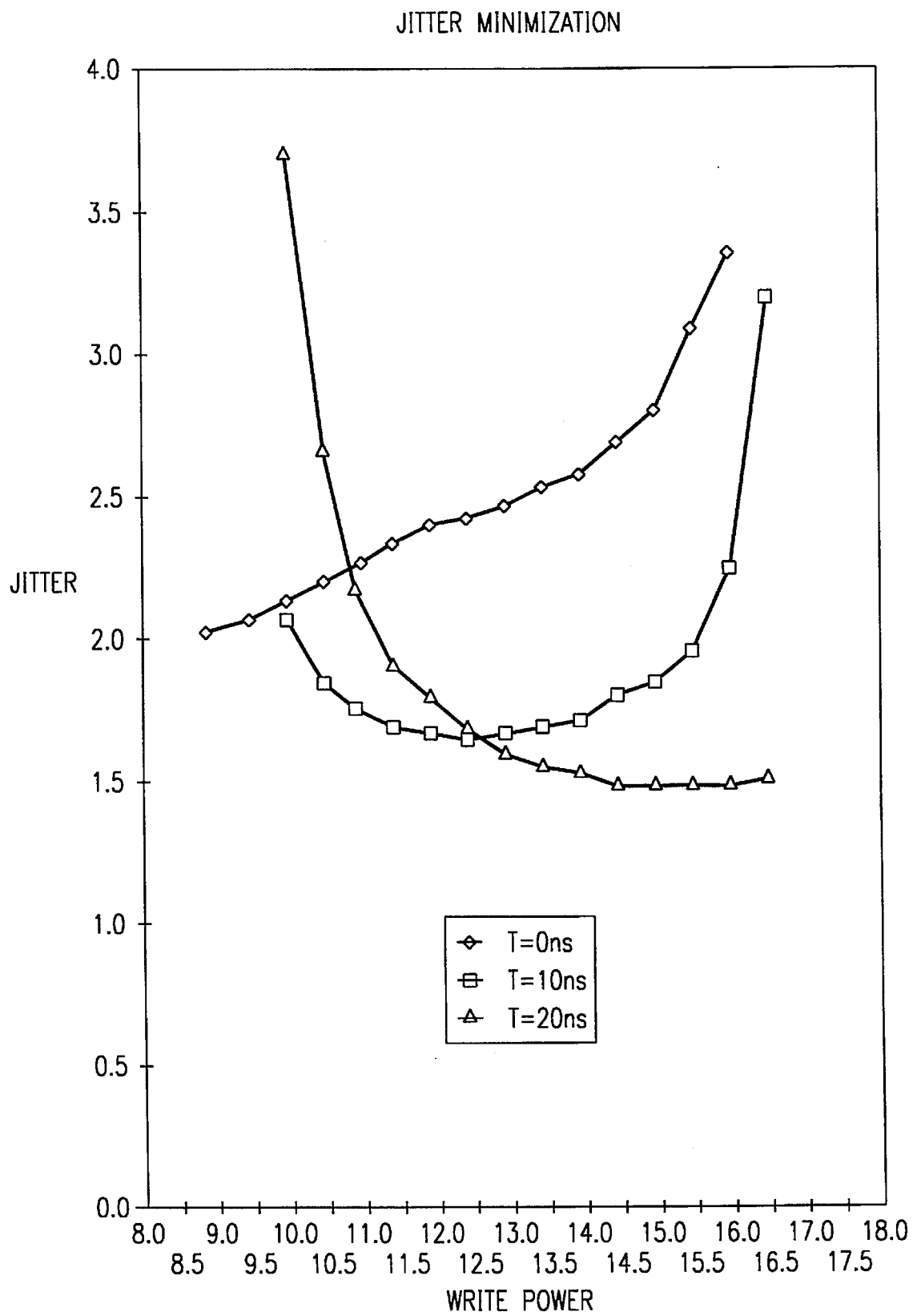

As illustrated in the plots of FIGS. 10 and 11, it has been found that the lengths of the delays $t_1$ and $t_2$ affect the quality (FOM and BER) of the recording marks. For example, in one set of tests, when $t_1$ and $t_2$ each equalled 20 ns, significantly higher measures of FOM values (up to 9.8) and lower measures of BER have been achieved relative to delays of 0 ns and 10 ns. In fact, in the tests illustrated in FIG. 10, delays of 0 ns (representing conventional LIM direct overwrite recording) and 10 ns did not provide even the minimum acceptable FOM of 9.0. It is not necessary for satisfactory performance of the driver 500 that $t_1$ and $t_2$ be equal.

Figure 12:
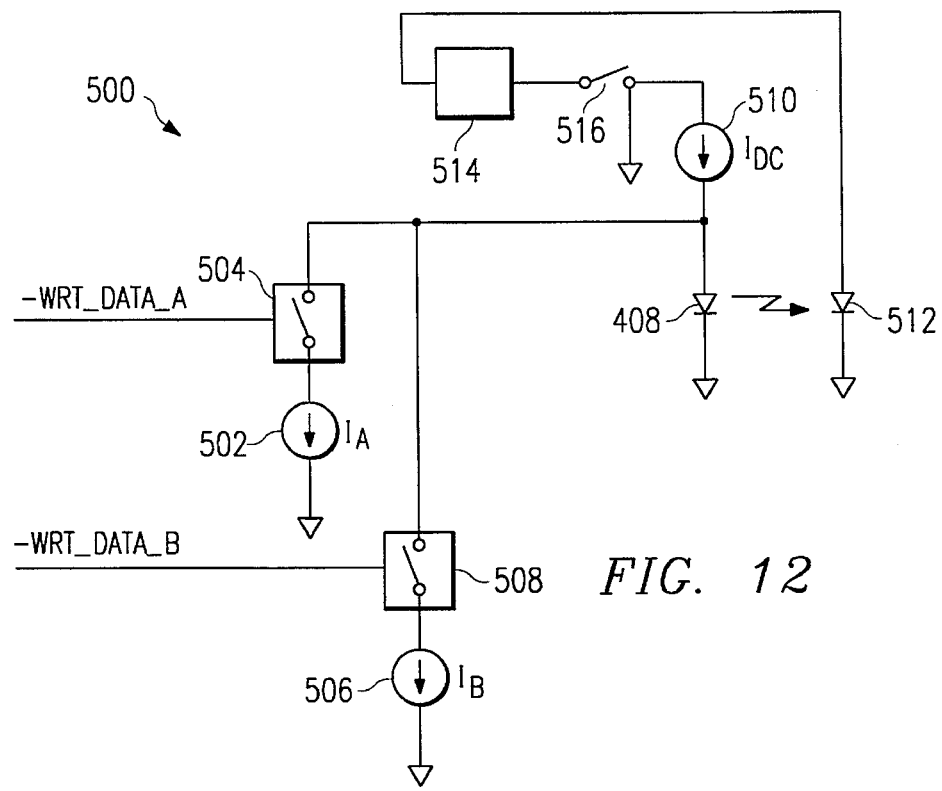
FIG. 12 is a block diagram of a laser driver of the present invention.

FIG. 12 is a block diagram of a laser driver 500 capable of producing the waveform of FIG. 8a. The laser driver 500 includes a first current source 502 transmitting a current $I_A$ to the laser 408 through a switch A 504, a second current source 506 transmitting a current $I_B$ to the laser 408 through a second switch B 508, and a third current source 510 transmitting a current $I_{DC}$ to the laser 408. Although the laser 408 is shown in FIG. 11 in an anode-driven configuration, the present invention is equally applicable to a cathode-driven configuration. The laser driver 500 also includes a power level feedback loop comprising a detector 512, a power servo 514 and a write gate 516. The control terminals of the switches 504 and 508 are interconnected with the logic module 900 to receive the -WRT__DATA__A and -WRT__DATA__B output signals, respectively, from the logic module 900. The open and closed states of the two switches 504 and 508 determine the total current driving the laser 408.

Figure 13:
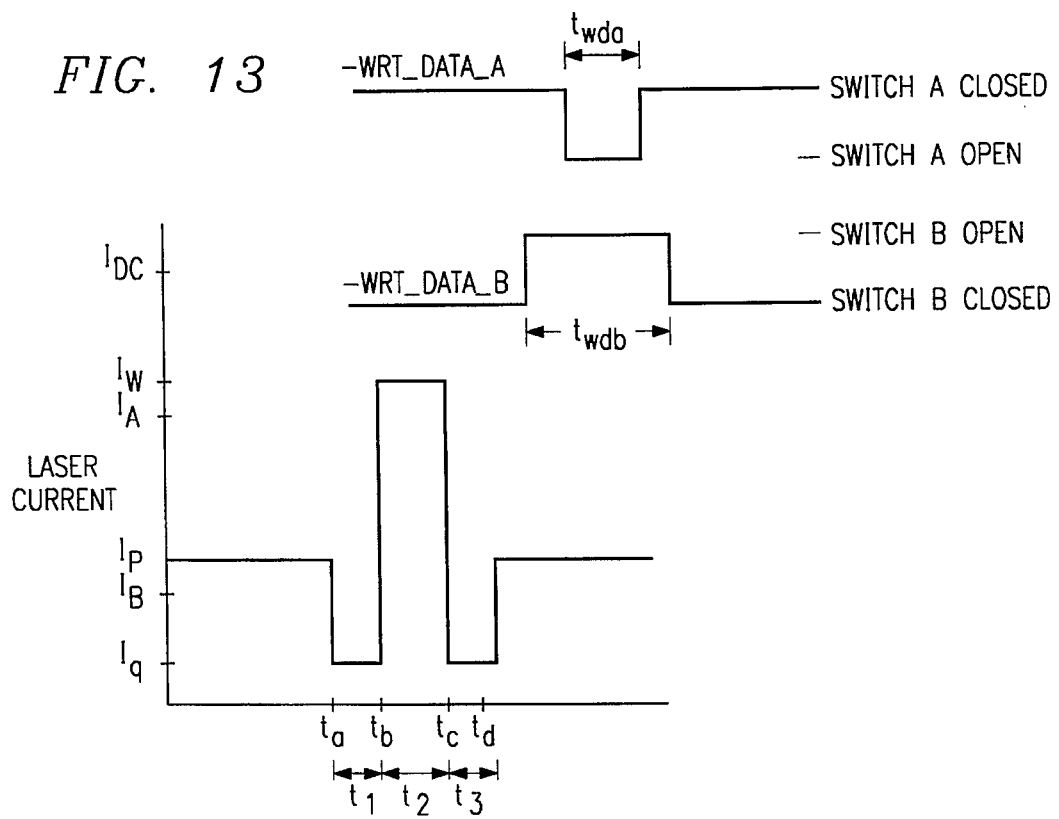
FIG. 13 is a timing diagram of control signals to which the laser driver is responsive.

FIG. 13 are plots of the states of the two switches 504 and 508 (indicative of the states of the -WRT_DATA_A and -WRT_DATA_B signals) and the resulting laser driving current. Thus, in the anode-driven configuration shown, the pedestal current level $I_p=I_{DC}-I_A$ is achieved when switch A 504 is closed and switch B 508 is open. The quiescent power level $I_q=I_{DC}-I_A-I_B$ is achieved when switch A 504 is closed and switch B 508 is open. And, the write current level $I_w=I_{DC}-I_B$ is achieved when switch A 504 is open and switch B 508 is closed.

The tests noted above demonstrate the benefits of pre- and post-pulse quenching. And, while the quench periods can be set when a drive is manufactured, as previously noted, each device, each piece of media and each drive/media combination may have slightly different characteristics, especially as the device or media age. Consequently, the present invention includes a procedure for a drive to calibrate the quench period each time an optical disk is mounted in the drive, based on any of the three measured quality characteristics, jitter, FOM or BER. Drive units of the present invention include the ability to measure the position error between the center of the readback clock pulse and the recording mark feature (the mark center in PPM recording and the mark edge in PWM recording). During a quench period adjustment operation, a series of marks are recorded on the disk using different quench periods. During a readback, the position errors are measured and, from the position error distribution (which typically has a Gaussian shape), the processor 404 determines the standard deviation of the distribution (jitter) and, in one embodiment, calculates the quench period which will result in the smallest jitter for the particular drive/media combination in use. Because a given jitter value can be associated with a range of write power levels, the processor 404 can adjust the pedestal power to further minimize the jitter. The processor 404 directs the laser driver to drive the laser at the selected write power level using the selected quench periods.

In an alternative embodiment, the processor 404 calculates a figure of merit from the jitter (FOM=(T/2–PS)/Jitter, where T is the clock period and PS is the average shift in position of the mark feature from the center of the clock pulse). Incorporating the PS into the equation increases the vertical separation between curves representing different quench times, thereby increasing the accuracy with which the processor 404 selects an optimal quench time.

In still another embodiment, the processor 404 uses the bit error rate (BER) is used to adjust the quench time. It has been found that the normal BER is dominated by disk defects and is not sufficiently sensitive to changes in the write waveform (including changes in the quench time). To overcome this drawback, a "stress BER" is employed in which the processor 404 intentionally directs that the detection window of the readback clock be narrowed or displaced in time. The BER will then rise above the defect level and become sensitive to changes in the write waveform. The processor 404 determines from the changes an optimal quench period.

Regardless of how the processor 404 determines the optimal quench period for the drive/media combination in use, once the quench period is determined, the processor 404 directs the laser driver to generate write waveforms having the desired characteristics.

Part of the process of manufacturing optical drives can include a calibration operation in which each drive is separately tested and programmed with the optimal quench time. Alternatively, the quench time can be tested each time a disk is mounted in the drive and adjusted if found to be less than optimal. As still another alternative, the quench time can be tested at predetermined periodic intervals and adjusted if found to be less than optimal.

While the invention has been particularly shown and described with reference to preferred embodiments thereof, it will be understood by those skilled in the art that various changes in form and details may be made therein without departing from the spirit and scope of the invention.

What is claimed is:

1. A magneto-optical storage system, comprising:

a loader for receiving a magneto-optical recording disk having at least a memory layer and a writing layer in an exchange-coupled relationship and deposited on a substrate;

a spindle motor for rotating the recording disk;

a laser source;

an optical head for focusing a beam spot from said laser source onto the recording disk;

an initializing magnet having a field with a first orientation relative to the recording disk;

a biasing magnet having field with a second orientation, opposite the first orientation; and a laser driver for:

driving said laser source at a pedestal power level $P_p$ until an information mark is to be recorded on the optical disk;

reducing the laser power level from the pedestal power level $P_p$ to a quench power level $P_q$ for a first time period $t_1$ beginning at time $t_a$, then increasing the laser power level from the quench power level $P_q$ to a write power level $P_w$ for a second time period $t_2$ beginning at time $t_b$, to record the information mark, where $P_w>P_p>P_q$; and a drive controller interconnected with said spindle motor, said laser source, said optical head, said biasing magnet and said laser driver, said drive controller comprising:

means for calculating a quality value of a readback signal reflected from the recording disk; and means for determining from the quality value the first time period $t_1$, whereby thermal interference between closely spaced recording marks is substantially reduced.

2. The system of claim 1, wherein said laser driver comprises:

a first delay module for delaying a -WRT_DATA signal for a first delay period equal to $t_1$, the -WRT_DATA signal being generated by said controller and comprising a write pulse having a width $t_k$ beginning at time $t_a$;

a second delay module for delaying the once-delayed -WRT_DATA signal for a second delay period equal to $t_2$;

an inverter for inverting the once-delayed -WRT_DATA signal;

a first logic gate for performing a logical NAND of the inverted, once-delayed -WRT_DATA signal and the twice-delayed -WRT_DATA signal and for generating a resulting -WRT_DATA_A signal;

a second logic gate for performing a logical NAND of the -WRT_DATA signal, the once-delayed -WRT_DATA signal and the twice-delayed -WRT_DATA signal and for generating a resulting -WRT_DATA_B signal;

whereby the WRT_DATA_A signal is in a first logic state for a time period $t_{wda}=t_2$ beginning at $t_b$ and the -WRT_DATA_B signal is in a second logic state for a time period $t_{wdb}=t_1+t_2+t_k$ beginning at $t_a$.

3. The system of claim 2, wherein:

said first delay module comprise means for generating the first delay period $t_1$ of approximately 20 ns; and said second delay module comprise means for generating the second delay period $t_2$ of approximately 20 ns.

4. The system of claim 1, wherein:

said laser driver further comprises means for reducing the laser power level from the write power level $P_w$ to the quench power level $P_q$ for a third time period $t_3$ beginning at time $t_c=t_a+t_1+t_2$, then increasing the laser power level from the quench power level $P_q$ to the pedestal power level $P_p$; and said drive controller further comprises means for determining from the quality value the third time period $t_3$.

5. The system of claim 4, wherein said laser driver further comprises:

a first delay module for delaying a -WRT_DATA signal for a first delay period equal to $t_1$ and beginning at $t_a$, the -WRT_DATA signal being generated by said controller and comprising a write pulse of width $t_k$ beginning at $t_a$;

a second delay module for delaying the once-delayed -WRT_DATA signal for the second delay period equal to $t_2$ and beginning at $t_b=t_a+t_1$;

an inverter for inverting the once-delayed -WRT_DATA signal;

a first logic gate for performing a logical NAND of the inverted once-delayed -WRT_DATA signal and the twice-delayed -WRT_DATA signal and for generating a resulting -WRT_DATA_A signal; and a second logic gate for performing a logical NAND of the -WRT_DATA signal, the once-delayed -WRT_DATA signal and the twice-delayed -WRT_DATA signal and for generating a resulting -WRT_DATA_B signal;

whereby the -WRT_DATA_A signal is in a first logic state for a time period $t_{wda}=t_2$ beginning at $t_b$ and the -WRT_DATA_B signal is in a second logic state for a time period $t_{wdb}=t_1+t_2+t_k$ beginning at $t_a$.

6. The system of claim 5, wherein said laser driver further comprises:

a first current source with an output $I_A$ and coupled to receive the -WRT_DATA_A signal;

a second current source with an output $I_B$;

a third current source with an output $I_{DC}$ and coupled to said laser source;

a first switch responsive to the -WRT_DATA_A signal and operable to connect said first current source to said laser source when the -WRT_DATA_A signal is in the first logic state and to disconnect said first current source from said laser source when the -WRT_DATA_A signal is in the second logic state; and a second switch responsive to the -WRT_DATA_B signal and operable to connect said second current source to said laser source when the -WRT_DATA_B signal is in the second logic state and to connect said second current source to said laser source when the -WRT_DATA_B signal is in the first logic state;

whereby, current flowing to said laser source equals:

$I_{DC}-I_A$ prior to the time $t_a$;

$I_{DC}-I_A-I_B$ during the time $t_1$;

$I_{DC}-I_B$ during the time $t_2$;

$I_{DC}-I_A-I_B$ during the time $t_3$; and $I_{DC}-I_A$ after the time $t_3$.

7. The system of claim 5, wherein:

said first delay module comprise means for generating the first delay period $t_1$ of approximately 20 ns; and said second delay module comprise means for generating the second delay period $t_2$ of approximately 20 ns.

8. The system of claim 1, wherein the quality value calculated by said drive controller is a figure of merit.

9. The system of claim 1, wherein the quality value calculated by said drive controller is a bit error rate.

10. The system of claim 1, wherein the quality value calculated by said drive controller is jitter.

11. The system of claim 1, wherein the quench power level $P_q$ is less than or equal to about 0.5 mW.

12. The system of claim 1, wherein the pedestal power level $P_p$ is about 4.5 mW.

13. The system of claim 1, wherein the write power level $P_w$ is about 9.8 mW.

14. The system of claim 1, further comprising a magneto-optical recording disk comprising at least a memory layer and a writing layer in an exchange-coupled relationship and deposited on a substrate.

15. The system of claim 14, wherein said initializing magnet and biasing magnet each comprise a permanent magnet.

16. The system of claim 14, wherein:

said recording disk further comprises a magnetized initiating layer in an exchange-coupled relationship with said writing layer;

said initializing magnet comprises said initiating layer of said recording disk; and said biasing magnet comprises a permanent magnet.

17. A driver for a laser in an optical storage drive in which information previously recorded on optical recording media is directly overwritten, the optical storage drive including: a loader for receiving a magneto-optical recording disk having at least a memory layer and a writing layer in an exchange-coupled relationship and deposited on a substrate; a spindle motor for rotating the recording disk; a laser source; an optical head for focusing a beam spot from said laser source onto the recording disk; a drive controller; an initializing magnet having a field with a first orientation relative to the recording disk; and a biasing magnet having field with a second orientation, opposite the first orientation, the driver comprising:

a first delay module for delaying a -WRT_DATA signal for a first delay period $t_1$ beginning at a time $t_a$, the -WRT_DATA signal generated by the drive controller and comprising a write pulse of width $t_k$ beginning at the time $t_a$;

a second delay module for delaying the once-delayed -WRT_DATA signal for a second delay period $t_2$ beginning at a time $t_b=t_a+t_1$;

an inverter for inverting the once-delayed -WRT_DATA signal;

a first logic gate for performing a logical NAND of the inverted once-delayed -WRT_DATA signal and the twice-delayed -WRT_DATA signal and for generating a resulting -WRT_DATA_A signal;

a second logic gate for performing a logical NAND of the -WRT_DATA signal, the once-delayed -WRT_DATA signal and the twice-delayed -WRT_DATA signal and for generating a resulting -WRT_DATA_B signal;

whereby the -WRT_DATA_A signal is in a first logic state for a time period $t_{wda}=t_2$ beginning at the time $t_b$ and the -WRT_DATA_B signal is in a second logic state for a time period $t_{wdb}=t_1+t_2+t_k$ beginning at the time $t_a$;

a first current source with an output $I_A$;

a second current source with an output $I_B$;

a third current source with an output $I_{DC}$ and coupled to said laser light source;

a first switch responsive to the -WRT_DATA_A signal to connect said first current source to said laser light source when the -WRT_DATA_A signal is in the first logic state and to disconnect said first current source from said laser light source when the -WRT_DATA_A signal is in the second logic state; and a second switch responsive to the -WRT_DATA_B signal to connect said second current source to said laser light source when the -WRT_DATA_B signal is in the second logic state and to connect said second current source to said laser light source when the -WRT_DATA_B signal is in the first logic state;

whereby, current flowing to said laser light source equals:

$I_{DC}-I_A$ to generate a laser power $P_p$;

$I_{DC}-I_A-I_B$ to generate a laser power $P_q$ during the time $t_1$;

$I_{DC}-I_B$ to generate a laser power $P_w$ during the time $t_2$;

$I_{DC}-I_A-I_B$ to generate the laser power $P_q$ during a time $t_3$; and $I_{DC}-I_A$ to generate the laser power $P_p$ after the time $t_3$.

18. In a light intensity, direct overwrite optical recording system in which, during the formation of a recording mark on an optical disk, a laser is driven a) at a pedestal power level, then b) at a quench power level for a first quench period $t_1$, the quench power level being less than the pedestal power level, then c) at a write power level for a write period $t_2$ whereby the reference bit becomes oriented in the writing direction, the write power level being greater than the pedestal power level, then d) at the quench power level for a second quench period $t_3$, and then e) at the pedestal power level until the formation of another recording mark begins, a method for determining optimal lengths of the quench periods $t_1$ and $t_3$ comprising the steps of:

recording a plurality of recording marks on the optical disk employing a plurality of quench periods $t_1$ and $t_3$;

reading the plurality of recording marks from the optical disk;

calculating a quality value for each of the plurality of recording marks;

identifying the quench periods $t_{1'}$ and $t_{3'}$ of the mark having the highest quality value; and directing that the laser be driven to form recording marks having quench periods $t_{1'}$ and $t_{3'}$.

19. The method of claim 18, wherein said step of calculating a quality value for each of the plurality of recording marks comprises the steps of:

measuring the position error between a recording mark feature;

determining a position error distribution;

calculating a standard deviation of the position error distribution; and determining the quench periods $t_{1'}$ and $t_{3'}$ which produce the smallest standard deviation of the position error distribution.

20. The method of claim 18, wherein said step of calculating a quality value for each of the plurality of recording marks comprises the step of:

measuring the position error between a recording mark feature;

determining a position error distribution;

calculating a standard deviation S of the position error distribution; and calculating a figure of merit FOM=(T/2−PS)/S, where T is a clock period and PS is the average shift in the position of the recording mark feature from the center of the clock pulse.

21. The method of claim 18, wherein said step of calculating a quality value for each of the plurality of recording marks comprises the step of measuring a bit error rate.

22. The method of claim 18, further comprising the steps of:

providing a first current source coupled through a first switch to the laser and generating a current $I_A$;

providing a second current source coupled through a second switch to the laser and generating a current $I_B$; and providing a third current source coupled to the laser and generating a current $I_{DC}$.

23. The method of claim 22, whereby, if the laser is in an anode-driven configuration, said steps of driving the laser at the pedestal power level, the quench power level and the write power level comprise the steps of:

driving the laser with a current equal to $I_{DC}-I_A$ to achieve the pedestal power level;

driving the laser with a current equal to $I_{DC}-I_A-I_B$ to achieve the quench power level; and driving the laser with a current equal to $I_{DC}-I_B$ to achieve the write power level.

24. The method of claim 23, further comprising the steps of:

providing a -WRT_DATA signal when a data bit is to be recorded, the -WRT_DATA signal comprising a write pulse having a width $t_k$ beginning at time $t_a$;

delaying the -WRT_DATA signal for a first delay period equal to $t_1$;

delaying the once-delayed -WRT_DATA signal for a second delay period equal to $t_2$;

inverting the once-delayed -WRT_DATA signal;

performing a logical NAND of the inverted, once-delayed -WRT_DATA signal and the twice-delayed -WRT_DATA signal and generating a resulting -WRT_DATA_A signal, whereby the -WRT_DATA_A signal is in a first logic state for a time period $t_{wda}=t_2$ beginning at $t_b$;

controlling the first switch with the -WRT_DATA_A signal;

performing a logical NAND of the -WRT_DATA signal, the once-delayed -WRT_DATA signal and the twice-delayed -WRT_DATA signal and generating a resulting -WRT_DATA_B signal, whereby the -WRT_DATA_B signal is in a second logic state for a time period $t_{wdb}=t_1+t_2 t_k$ beginning at $t_a$; and controlling the second switch with the -WRT_DATA_B signal.

25. The method of claim 22, whereby, if the laser is in a cathode-driven configuration, said steps of driving the laser at the pedestal power level, the quench power level and the write power level comprise the steps of:

driving the laser with a current equal to $I_{DC}$ to achieve the pedestal power level;

driving the laser with a current equal to $I_{DC}-I_B$ to achieve the quench power level; and driving the laser with a current equal to $I_{DC}+I_A-I_B$ to achieve the write power level.

* * * * *